US012786686B2

(12) United States Patent
Featherstone et al.

(10) Patent No.: US 12,786,686 B2
(45) Date of Patent: Nov. 3, 2026

(54) PRESENCE SERVER FOR EDGE COMPUTING

(71) Applicant: Apple Inc., Cupertino, CA (US)

(72) Inventors: Walter Featherstone, Cirencester (GB); Haijing Hu, Los Gatos, CA (US); Mona Agnel, Guildford (GB); Robert Zaus, Munich (DE); Shu Guo, Beijing (CN); Sudeep Manithara Vamanan, Uttenreuth (DE)

(73) Assignee: Apple Inc., Cupertino, CA (US)

(*) Notice: Subject to any disclaimer, the term of this patent is extended or adjusted under 35 U.S.C. 154(b) by 200 days.

(21) Appl. No.: 18/290,938

(22) PCT Filed: Feb. 6, 2023

(86) PCT No.: PCT/CN2023/074544
§ 371 (c)(1),
(2) Date: Jan. 22, 2024

(87) PCT Pub. No.: WO2024/164107
PCT Pub. Date: Aug. 15, 2024

(65) Prior Publication Data

US 2025/0106612 A1 Mar. 27, 2025

(51) Int. Cl.
*H04W 8/14* (2009.01)
*H04W 24/02* (2009.01)

(52) U.S. Cl.
CPC ............ *H04W 8/14* (2013.01); *H04W 24/02* (2013.01)

(58) Field of Classification Search
CPC ......... H04W 8/14; H04W 24/02; H04W 4/02; H04L 67/51; H04L 67/52; H04L 67/54
See application file for complete search history.

(56) References Cited

U.S. PATENT DOCUMENTS

| | | | | |
|---|---|---|---|---|
| 2012/0066360 | A1* | 3/2012 | Ghosh | H04L 43/106 709/223 |
| 2022/0191776 | A1* | 6/2022 | Kim | H04L 67/51 |
| 2022/0414889 | A1* | 12/2022 | Calvarese | G06T 7/11 |

FOREIGN PATENT DOCUMENTS

| | | |
|---|---|---|
| CN | 113812133 | 12/2021 |
| CN | 115136628 | 9/2022 |
| WO | 2022069121 | 4/2022 |
| WO | 2022232132 | 11/2022 |
| WO | 2022/268298 | 12/2022 |

* cited by examiner

*Primary Examiner* — John J Lee
(74) *Attorney, Agent, or Firm* — Fay Kaplun & Marcin, LLP

(57) ABSTRACT

An edge computing component is configured to receive application specific user information for a first application client (AC) user from a first user equipment (UE) with a first AC, receive application specific user information for a second AC user from a second UE with a second AC, identify a condition related to a location of the first AC relative to one or more service areas related to edge computing and transmit a notification to the second UE, the notification indicating a presence of the first AC user relative to the one or more service areas.

18 Claims, 10 Drawing Sheets

Signaling Diagram 800

Signaling Diagram 700

PRESENCE SERVER FOR EDGE COMPUTING

TECHNICAL FIELD

The present disclosure generally relates to wireless communication, and in particular, to presence server for edge computing.

BACKGROUND

A user equipment (UE) may connect to an edge data network to access edge computing services. Edge computing refers to performing computing and data processing at the network where the data is generated. When connected, application data may flow between an application client (AC) running on the UE and an edge application server (EAS) of the edge data network. It has been identified that there exists a need for mechanisms configured to enable an AC user to know when other users are available to interact with at the application level.

SUMMARY

Some exemplary embodiments are related to a method performed at an edge computing component. The method includes. receiving application specific user information for a first application client (AC) user from a first user equipment (UE) with a first AC, receiving application specific user information for a second AC user from a second UE with a second AC, identifying a condition related to a location of the first AC relative to one or more service areas related to edge computing and transmitting a notification to the second UE, the notification indicating a presence of the first AC user relative to the one or more service areas.

Other exemplary embodiments are related to a method performed at a user equipment (UE) comprising an application client (AC). The method includes transmitting application specific user information for a first AC user to an edge computing component, transmitting subscription information to the edge computing component, the subscription information including a request for information corresponding to at least a second AC user relative to one or more service areas relating to edge computing and receiving a notification from the edge computing component, the notification indicating a presence of the second AC user relative to the one or more service areas.

DETAILED DESCRIPTION

Figure 1:
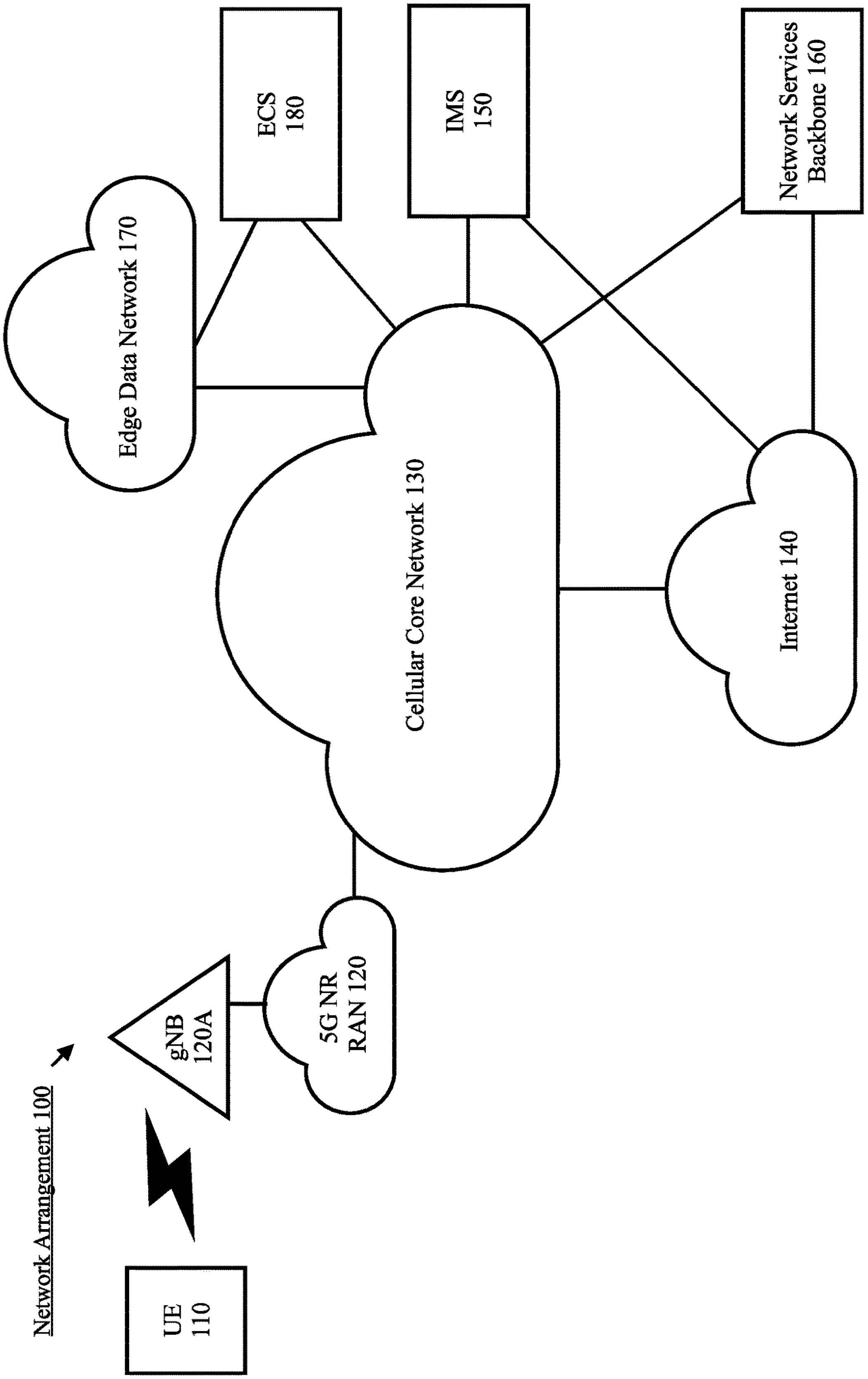
FIG. 1 shows an exemplary arrangement according to various exemplary embodiments.

The exemplary embodiments may be further understood with reference to the following description and the related appended drawings, wherein like elements are provided with the same reference numerals. The exemplary embodiments relate to edge computing. As will be described in more detail below, the exemplary embodiments introduce mechanisms that enable an application client (AC) user to know when other AC users are available to interact with at an application level.

The exemplary embodiments are described with regard to a user equipment (UE). However, reference to a UE is merely provided for illustrative purposes. The exemplary embodiments may be utilized with any electronic component that is configured with the hardware, software, and/or firmware to exchange information and data with the network. Therefore, the UE as described herein is used to represent any appropriate electronic component.

The exemplary embodiments are also described with regard to a fifth generation (5G) New Radio (NR) network. However, reference to a 5G NR network is merely provided for illustrative purposes. The exemplary embodiments may be utilized with any network that allows the UE to access an edge data network.

The UE may access the edge data network via the 5G NR network. The edge data network may provide the UE with access to edge computing services. Those skilled in the art will understand that edge computing refers to performing computing and data processing at the network where the data is generated. In contrast to legacy approaches that utilize a centralized architecture, edge computing is a distributed approach where data processing is localized towards the network edge, closer to the end user. This allows performance to be optimized and latency to be minimized.

Application data may flow between an AC running on the UE and an edge application server (EAS) of the edge data network. The UE may be equipped with one or more edge enabler clients (EECs), each configured to provide support to one or more ACs. The EEC may perform various operations related to procedures such as, but not limited to, service provisioning, EEC registration and EAS discovery. Thus, each EEC may be configured to handle a wide array of different parameters and perform various different operations in support of one or more applications installed on the UE.

Edge applications may encompass a wide variety of different types of services. For example, an AC running on the UE may be for a gaming service that uses edge computing. In another example, an AC running on the UE may be for a messaging service that uses edge computing. However, any reference to a specific type of application or service is merely provided for illustrative purposes. The exemplary embodiments are not limited to any particular type of application or service and may be used for any appropriate type of application or service that is configured to use edge computing.

Figure 4:
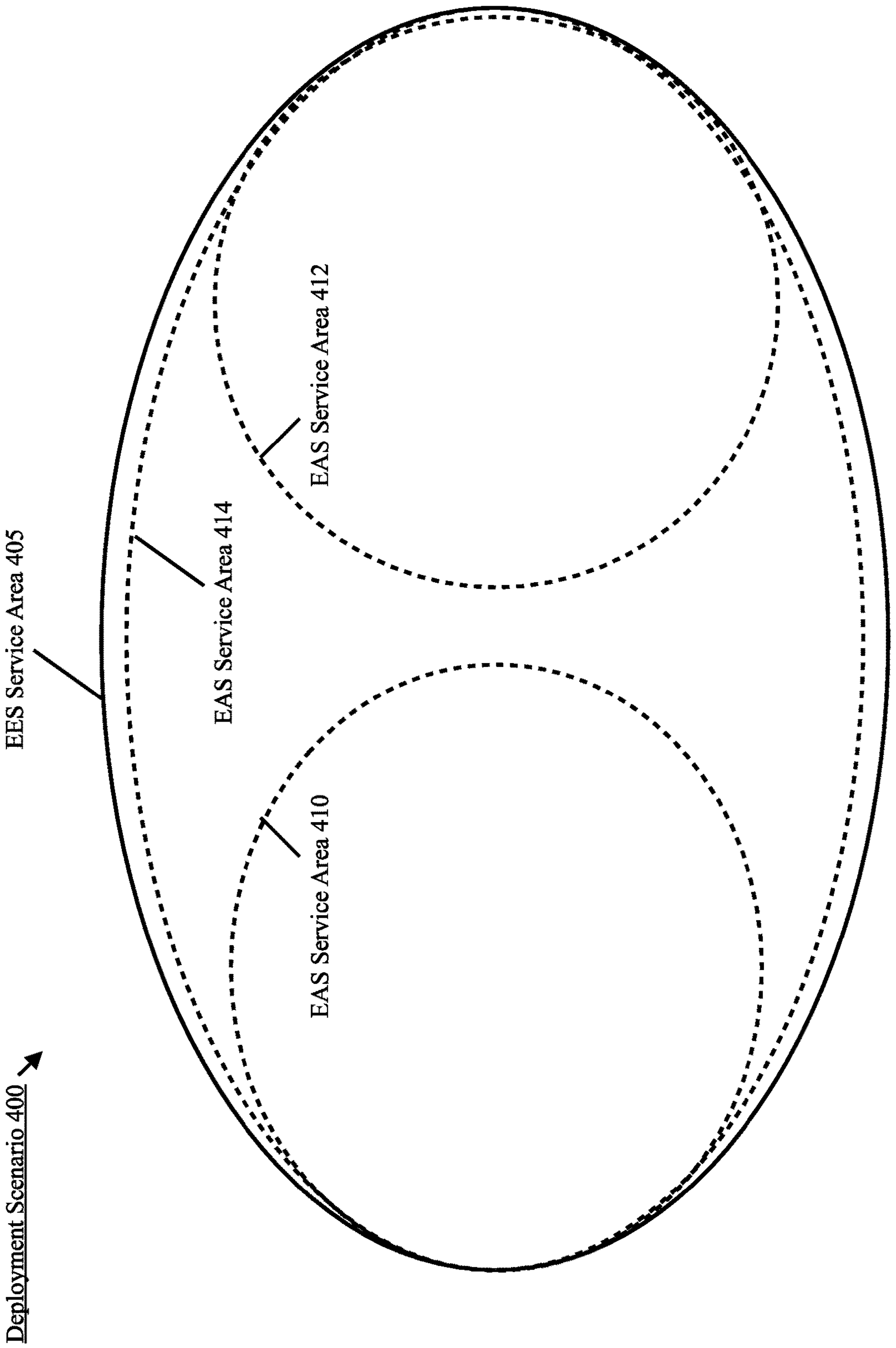
FIG. 4 shows an exemplary deployment scenario according to various exemplary embodiments.

In an edge computing environment, ACs may interact with one another when they are within a common service area. Those skilled in the art will understand that the term "service area" generally refers to a geographical area that is served by an EES and/or EAS. An example of a deployment scenario comprising multiple service areas is described in detail below with regard to the deployment scenario 400 of FIG. 4.

Since ACs may interact with one another when they are within a common service area, it may be beneficial for a user of an AC to know when other users are located within a particular service area. For example, consider a scenario in which the AC is for a gaming service that uses edge computing. A user of the AC (User-1) may want to know when their friends (User-2, User-3, etc.) are available to play a game provided by the gaming service. To play the game together, the ACs may have to be deployed within a common service area and thus, User-1 may want to know when particular users (e.g., User-2, User-3, etc.) are located within a certain service area.

The exemplary embodiments introduce mechanisms that enable a user of an AC to know when other users are available to interact with at the application level. According to some aspects, the exemplary embodiments introduce a presence server that is configured to track AC users across service areas. In addition, the exemplary embodiments include techniques for notifying a user when certain users are located within a particular service area. The exemplary embodiments described herein may be used independently from one another, in conjunction with other currently implemented edge computing mechanisms, in conjunction with future implementations of edge computing mechanisms or independently from other edge computing mechanisms.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network arrangement 100, the network with which the UE 110 may wirelessly communicate is a 5G NR radio access network (RAN) 120. However, the UE 110 may also communicate with other types of networks (e.g., sixth generation (6G) RAN, 5G cloud RAN, a next generation RAN (NG-RAN), a long-term evolution (LTE) RAN, a legacy cellular network, a wireless local area network (WLAN), etc.) and the UE 110 may also communicate with networks over a wired connection. In this example, the UE 110 may establish a connection with the 5G NR RAN 120. Therefore, the UE 110 may have at least a 5G NR chipset to communicate with the NR RAN 120.

The 5G NR RAN 120 may be a portion of a cellular network that may be deployed by a network carrier. The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

Those skilled in the art will understand that any association procedure may be performed for the UE 110 to connect to the 5G NR RAN 120. For example, as discussed above, the 5G NR RAN 120 may be associated with a particular cellular provider where the UE 110 and/or the user thereof has a contract and credential information (e.g., stored on a SIM card). Upon detecting the presence of the 5G NR RAN 120, the UE 110 may transmit the corresponding credential information to associate with the 5G NR RAN 120. More specifically, the UE 110 may associate with a specific base station (e.g., gNB 120A).

The network arrangement 100 also includes a cellular core network 130, the Internet 140, an IP Multimedia Subsystem (IMS) 150, and a network services backbone 160. The cellular core network 130 may refer to an interconnected set of components that manages the operation and traffic of the cellular network. It may include the evolved packet core (EPC) and/or the 5G core (5GC). The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

In addition, the network arrangement 100 includes an edge data network 170 and an ECS 180. The edge data network 170 and the ECS 180 will be described in more detail below with regard to FIG. 3. Those skilled in the art will understand that an actual network arrangement may include any appropriate number of edge data networks and ECSs. Thus, the example of a single edge data network 170 and single ECS 180 is merely provided for illustrative purposes.

Figure 2:
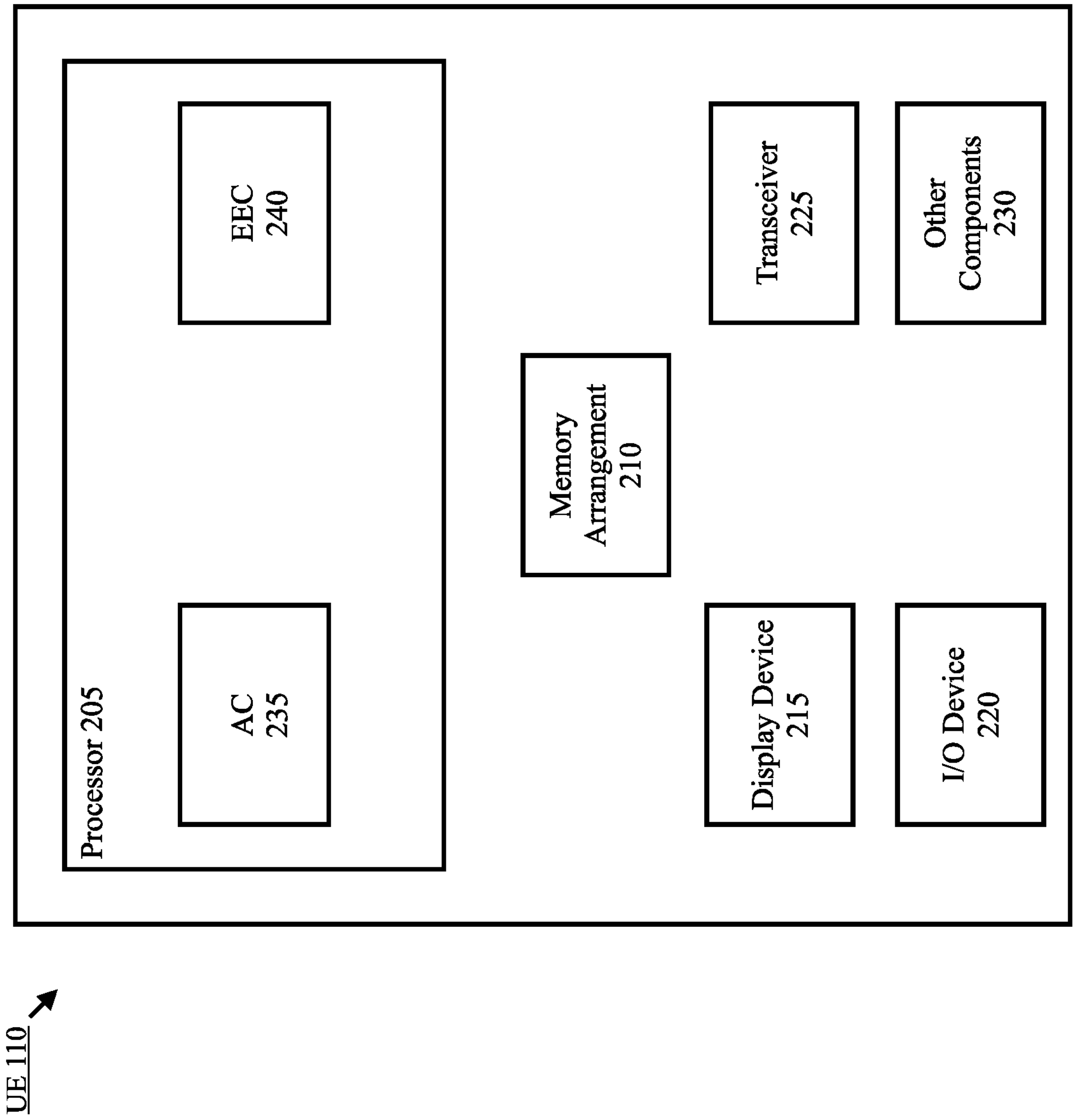
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute various types of software. For example, the processor may execute an AC 235 and an EEC 240. The AC 235 may perform operations related to an application installed on the UE 110 exchanging application data with a server via a network. The EEC 240 may perform operations in support of the AC 235. For example, the EEC 240 may perform operations related to procedures such as, but not limited to, service provisioning, EEC registration and EAS discovery. However, reference to a single AC 235 and EEC 240 is merely provided for illustrative purposes. The UE 110 may be equipped with any appropriate number of ACs supported by an appropriate number of EECs. The AC 235 and the EEC 240 are discussed in more detail below with regard to FIG. 3.

The above referenced software being executed by the processor 205 is only exemplary. The functionality associated with the software may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The software may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, an LTE-RAN (not pictured), a legacy RAN (not pictured), a WLAN (not pictured), etc. Accordingly, the transceiver 225 may operate on a variety of different frequencies or channels (e.g., set of consecutive frequencies).

Figure 3:
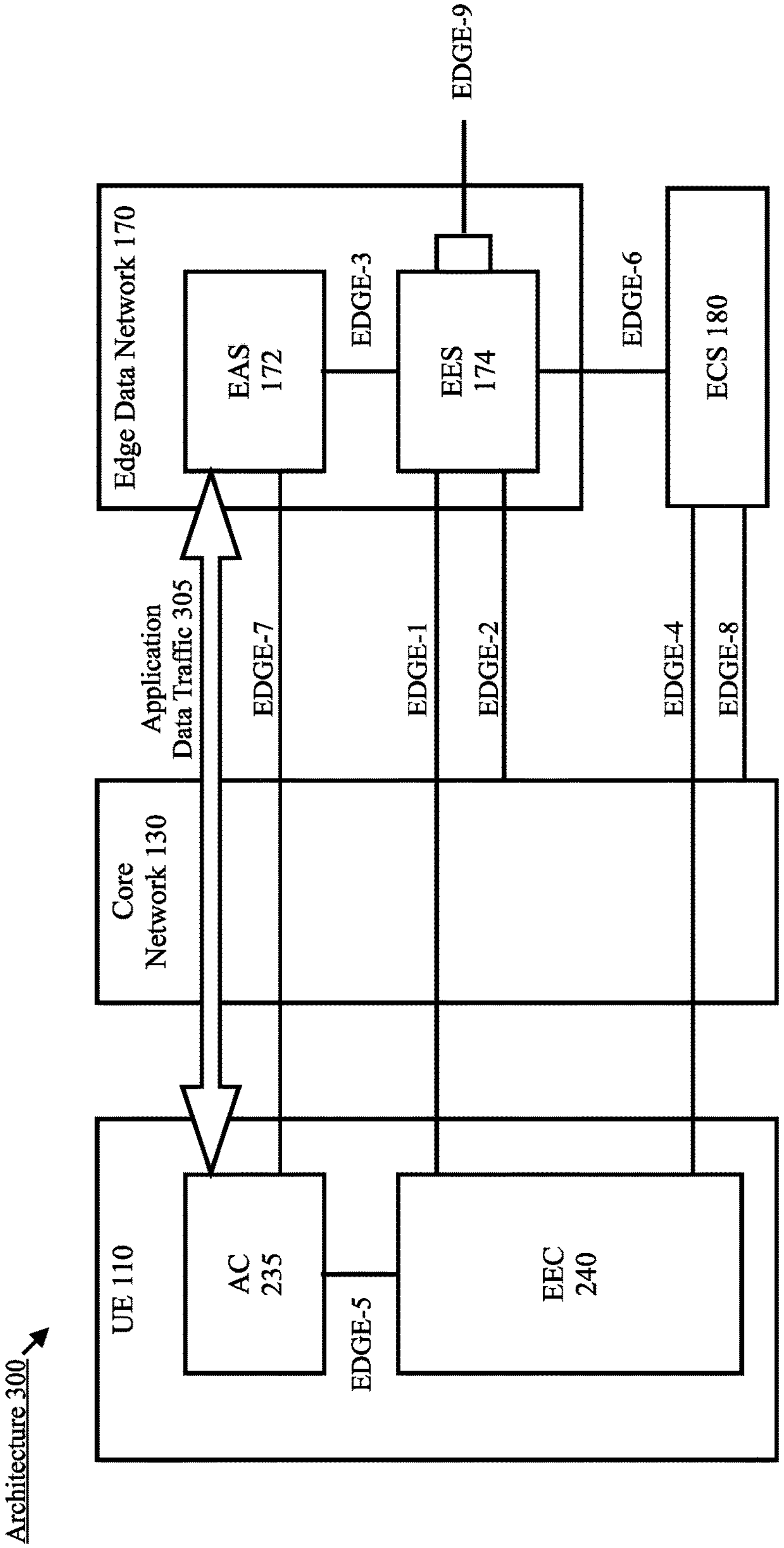
FIG. 3 shows an architecture for enabling edge applications according to various exemplary embodiments.

FIG. 3 shows an architecture 300 for enabling edge applications according to various exemplary embodiments. The architecture 300 will be described with regard to the network arrangement 100 of FIG. 1 and the UE 110 of FIG. 2. The architecture 300 provides a general example of the type of components that may interact with one another when the UE 110 is configured to exchange application data traffic 305 with the edge data network 170.

The architecture 300 includes the UE 110, the core network 130 and the edge data network 170. The UE 110 may establish a connection to the edge data network 170 via the core network 130 and various other components (e.g., gNB 120A, the 5G NR RAN 120, network functions, etc.).

In the architecture 300, the various components are shown as being connected via reference points labeled edge-x (e.g., edge-1, edge-2, edge-3, edge-4, edge-5, edge-6, edge-7, edge-8, etc.). Those skilled in the art will understand that each of these reference points (e.g., connections, interfaces, etc.) are defined in 3GPP Specifications. The exemplary architecture 300 may use these reference points in the manner in which they are defined in the 3GPP Specifications and the manner in which they are described herein. Furthermore, it should be understood that these reference points are not required to be wired or wireless connections, e.g., the reference points may facilitate communication via intervening hardware and/or software components. To provide one example, the UE 110 communicates over the air with the gNB 120A. However, in the architecture 300 the UE 110 is shown as having a connection to the ECS 180. This connection is not a direct link between the UE 110 and the ECS 180. Instead, this is a connection that is facilitated by intervening hardware and software components. Thus, throughout this description the terms "connection," "reference point" and "interface" may be used interchangeably to describe the connections between the various components in the architecture 300 and the network arrangement 100.

Once connected, application data traffic 305 may flow between the AC 235 running on the UE 110 and the EAS 172 of the edge data network 170. The EAS 172 may be accessed through the core network 130 via uplink classifiers (CL) and branching points (NP) or in any other appropriate manner.

The EEC 240 may be configured to provide supporting functions for the AC 235. For example, the EEC 240 may perform operations related to procedures such as, but not limited to, EAS discovery and the retrieval and provisioning of configuration information that may enable the exchange of the application data traffic 305 between the AC 235 and the EAS 172. Those skilled in the art will understand the variety of different types of operations and configurations relevant to an EEC. Further, reference to a single AC 235 and EEC 240 is merely provided for illustrative purposes, the UE 110 may be equipped with any appropriate number of application clients and EECs.

The edge data network 170 may also include an edge enabler server (EES) 174. The EES 174 may be configured to provide supporting functions to the EAS 172 and the EEC 240 running on the UE 110. For example, the EES 174 may perform operations related to procedures such as, but not limited to, provisioning configuration to enable the exchange of the application data traffic 305 between the UE 110 and the EAS 172 and providing information related to the EAS 172 to the EEC 240 running on the UE 110. Those skilled in the art will understand the variety of different types of operations and configurations relevant to an EES. Further, reference to the edge data network 170 including a single EAS 172 and a single EES 174 is merely provided for illustrative purposes. In an actual deployment scenario, an edge data network may include any appropriate EASs and EESs interacting with any number of UEs.

The ECS 180 may be configured to provide supporting functions for the EEC 240 to connect the EES 174. For example, the ECS 180 may perform operations related to concepts such as, but not limited to, provisioning of edge configuration information to the EEC 240. The edge configuration information may include the information for the EEC 240 to connect to the EES 174 (e.g., service area information, etc.) and the information for establishing a connection with the EES 174 (e.g., uniform resource identifier (URI). Those skilled in the art will understand the variety of different types of operations and configurations relevant to an ECS.

In the network arrangement 100 and the enabling architecture 300, the ECS 180 is shown as being outside of the edge data network 170 and the core network 130. However, this is merely provided for illustrative purposes. The ECS 180 may be deployed in any appropriate virtual and/or physical location (e.g., within the mobile network operator's domain, within the edge serve provider domain or within a third-party domain) and implemented via any appropriate combination of hardware, software and/or firmware.

As mentioned above, according to some aspects, the exemplary embodiments may enable a user of an AC to know when other users are available to interact with at the application level. The user of the AC may be the UE subscriber or an application user that is not the UE subscriber but has provided credentials to access a service via the AC. Those skilled in the art will understand that each user may be uniquely identified at the application level by application specific user information. To provide one example, AC users may each have their own unique user ID. Throughout this description, to differentiate between ACs being used by different users, examples may reference UserID-1, UserID-2, UserID-3, etc. However, reference to the term "UserID" is merely provided for illustrative purposes. There is a wide array of different type of application specific information that may be used to uniquely identify a user. The exemplary embodiments may use any appropriate type of information to uniquely identify users at the application level. Therefore, the term "UserID" as described herein is used to represent an AC that is uniquely identified by any appropriate type of application specific information.

The exemplary embodiments are described with regard to a server that is configured to track AC users across one or more service areas. Throughout this description, this server may be referred to as "presence server." However, reference to the term presence server is merely provided for illustrative purposes, different entities may refer to a similar concept by a different name. Within the context of the network arrangement 100 of FIG. 1 and the enabling architecture 300 of FIG. 3, the presence server may be a component of the edge data network 170, a functionality of an ECS, a functionality of an EES, a component located outside of the locations shown in the network arrangement 100 and the enabling architecture 300 or any combination thereof. Any reference to the presence server being implemented at a particular physical or virtual location is merely provided for illustrative purposes. The presence server may be deployed at any appropriate virtual and/or physical location and implemented via any appropriate combination of hardware, software and/or firmware.

Throughout this description, a service area may generally refer to a geographical area that is served by an EAS or EES. Therefore, the term "service area" is specific to edge computing components. An example deployment scenario comprising multiple service areas is described below with regard to the exemplary deployment scenario 400 of FIG. 4. The exemplary deployment scenario 400 is provided as a non-limiting example to illustrate the concept of service areas and provide context for various exemplary embodiments described below. Specific examples of presence server operations are described below with regard to the method 500 of FIG. 5 and the examples 600-620 of FIGS. 6*a*-6*c*.

The deployment scenario 400 includes an EES service area 405 and three EAS service areas 410-414. The EES service area 405 may represent a geographical location that is served by an EES. The EAS service areas 410-414 may be served by one or more EASs. In some embodiments, each EAS service area 410-414 may be served by a different instance of a same EAS. To provide an example, an EAS may have an EAS identifier (e.g., EAS-1). EAS-1 may have three instances referred to below as EAS-1 instance 1, EAS-1 instance 2 and EAS-1 instance 3. In this example, EAS-1 instance 1 may provide service to service area 410, EAS-1 instance 2 may provide service to service area 412 and EAS-1 instance 3 may provide service to service area 414. Each EAS-1 instance may be operated independently of one another. In other embodiments, each EAS service area may be served by a different EAS. For example, EAS-1 may provide service to service area 410, a second EAS (EAS-2) may provide service to service area 412 and a third EAS (EAS-3) may provide service to service area 414. The above examples are merely provided for illustrative purposes and are not intended to limit the exemplary embodiments in any way. In an actual deployment scenario, any number of EES service areas may be operated by any number of EESs and/or instances of an EES and any number of EAS service areas may be operated by any number of EASs and/or instances of a same EAS.

Figure 5:
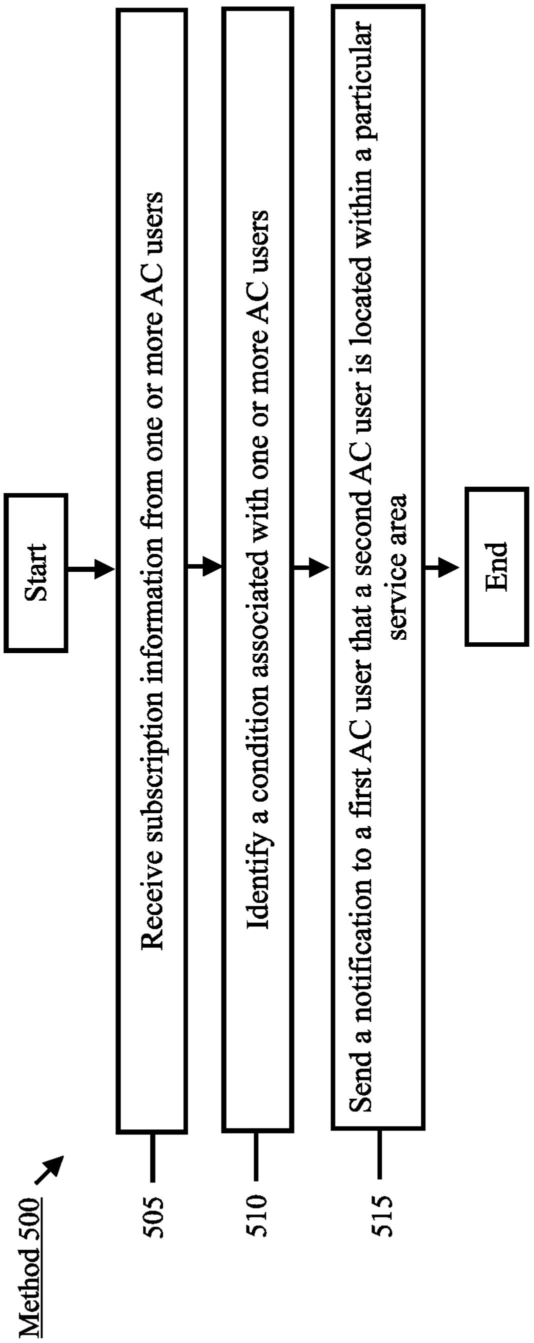
FIG. 5 shows a method for using a presence server to track application client (AC) users across service areas according to various exemplary embodiments.

FIG. 5 shows a method 500 for using a presence server to track AC users across service areas according to various exemplary embodiments. The method 500 is described from the perspective of a presence server and provided as a general overview of the type of operations that may be performed by a presence server in accordance with the exemplary embodiments. In addition, the method 500 is described with regard to three different ACs identified as UserID-1, UserID-2 and UserID-3. After the description of the method 500, reference is made to examples 600-620 of FIGS. 6*a*-6*c* that each show the AC users (UserID-1, UserID-2 and UserID-3) at different locations relative to the deployment scenario 400.

In 505, the presence server receives subscription information for one or more AC users. The subscription information may include an indication that a user wants to be informed when specific users are within certain service areas. In addition, the subscription information may include an indication that a user consents to notifications about their presence in a service area being provided to other specific application users (e.g., presence information). For example, UserID-1 may indicate to the presence server that it wants to be notified when UserID-2 and UserID-3 enter one or more of the services areas shown in the exemplary deployment scenario 400. UserID-1 may also consent to the presence server notifying UserID-2 and/or UserID-3 when UserID-1 enters one or more of the services areas shown in the exemplary deployment scenario 400. UserID-2 and UserId-3 may provide similar subscription information and user consent to the presence server such that each of the users are subscribed to be notified when each other are present in certain service areas.

The users may provide the subscription information to the presence server via an AC running on a UE or in any other appropriate manner. However, the manner in which the subscription information is provided to the presence server is beyond the scope of the exemplary embodiments.

In 510, the presence server identifies a condition associated with one or more AC users. The condition may be based on the subscription information provided in 505 and/or any other appropriate factor. For example, the presence server may identify and/or receive information that indicates whether UserID-1, UserID-2 and UserID-3 are located within one of the service areas shown in the exemplary deployment scenario 400.

In some embodiments, the subscription information may also include trigger conditions. For example, an AC user may request to be notified only if each AC user from a set of AC users is present in a service area. In another example, an AC user may request that they are notified of certain status changes for another particular user (e.g., do not disturb, in-game, idle, etc.). In a further example, an AC user may request that they are notified when another AC user is predicted to leave the service area. The above examples are provided for illustrative purposes and are not intended to limit the exemplary embodiments in any way.

Once subscribed, an AC user may modify or update their subscription information. For example, UserID-1 may send a request to the presence server that it would like to modify its subscription information to remove a UserID from a list of UserIDs from which UserID-1 is to receive corresponding presence information, add a UserID to the list of UserIDs from which UserID-1 is to receive corresponding presence information, remove a UserID from the list of UserIDs that are not permitted to receive UserID-1 presence information or add a UserID to the list of UserIDs that are permitted to receive UserID-1 presence information. The above examples are provided for illustrative purposes and are not intended to limit the exemplary embodiments in any way.

In 515, the presence server sends a notification to a first AC user that indicates a second AC user is located within a particular server area. For example, in response to 510, UserID-1 may be notified that UserID-2 and/or UserID-3 are available for interaction within a particular service area. The notification may be sent to the user in any appropriate manner.

Throughout this description, presence information may be used to generally refer to information indicating that a particular AC user is located within a particular service area. Thus, the terms "presence server" and "presence information" as described herein relate to a user presence within a particular service area of an EAS or ECS. The exemplary embodiments may be implemented using edge enabling architecture instead of access network architecture because the access network does not inherently have knowledge of the service areas relating to the edge cloud. In addition, it may be beneficial to maintain a separation between the unique application specific information (e.g., UserID) and access network identifiers (e.g., 3GPP identifiers). However, in some embodiments, there may be a link between the unique application specific information and one or more access network identifiers. For example, there may be an association between the unique application specific information and a subscription permanent identifier (SUPI) which relates to the UE subscriber, an association between the unique application specific information and a permanent equipment identifier (PEI) which relates to the UE hardware, an association between the unique application specific information and a generic public subscription identifier (GPSI) which is linked to the SUPI and can be in the form of a telephone number or an association between the unique application specific information and an IP address assigned by the core network.

Instead of or in addition to the subscription information described above, a query procedure may be used to retrieve current presence information. For example, UserID-1 may query the presence server for current presence information associated with UserID-2 and/or UserID-3. In another example, the presence server may query UserID-1 to retrieve and/or generate presence information for UserID-1 that may be provided to other AC users.

According to some aspects, EEC context may be expanded to include maintenance of AC user presence information. For example, EEC registration may result in an EEC context being created in the edge enablement layer at the EES. In support of service continuity between a source and target EAS (e.g., switching an AC-EAS connection from one EAS instance (source EAS) to another EAS (target EAS) in response to UE mobility)), the EEC context with the latest presence information may be transferred between the associated source and target EAS.

Figure 6A:
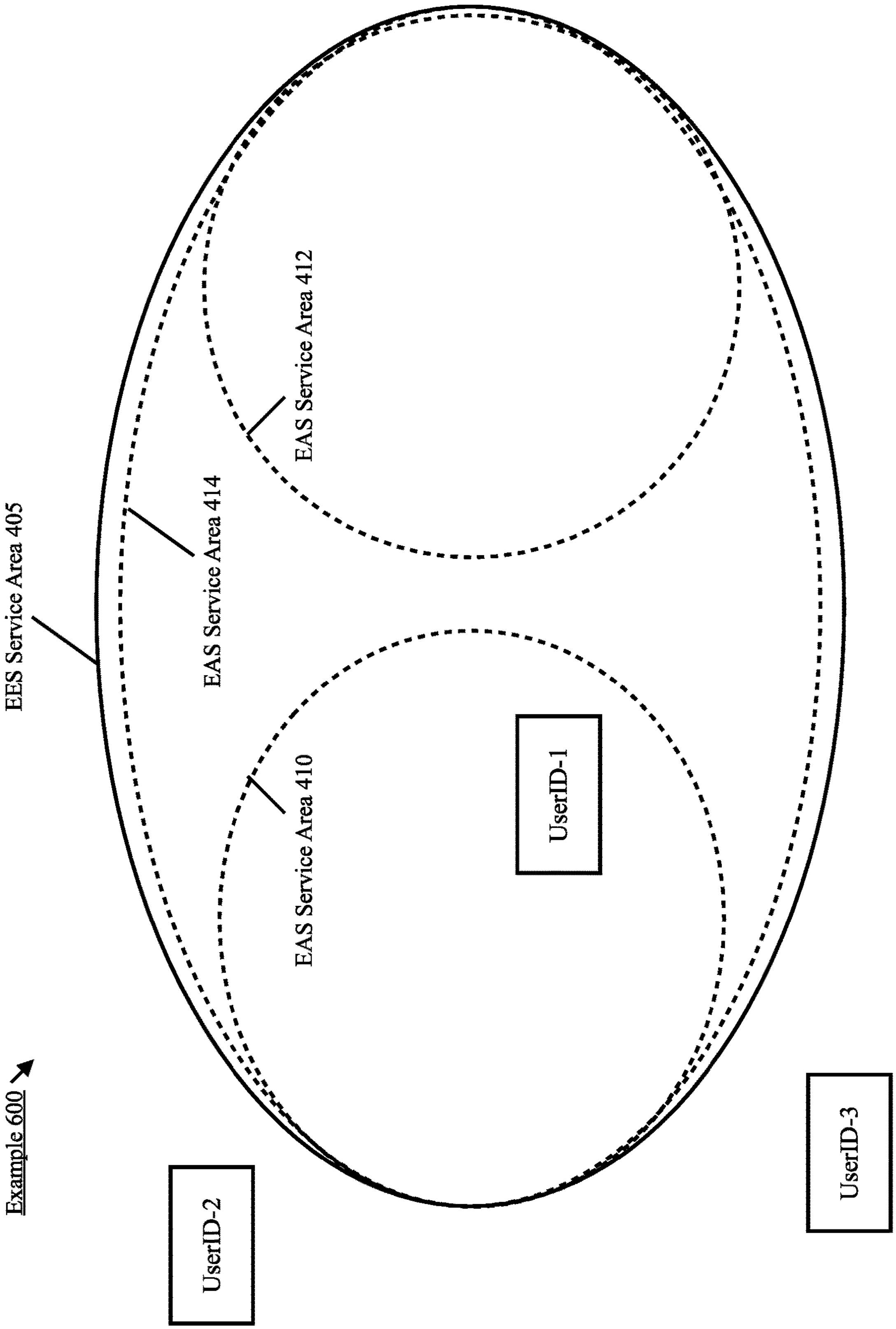
FIGS. 6*a*-6*c* show multiple examples of users located within one or more service areas according to various exemplary embodiments.

In example 600 of FIG. 6*a*, UserID-1 is shown within overlapping service areas including EES service area 405, EAS service area 410 and EAS service area 414. The presence server may record that UserID-1 is in EES service area 405, EAS service area 410 and EAS service area 414. UserID-2 and UserID-3 are both shown to be outside all of the service areas shown in example 600. Since none of users (e.g., UserID-1, UserID-2 or UserID-3) are in a common service area, the ACs may not be able to interact with one another at this time. In some embodiments, no notification may be provided to any of the users since none of the users are in a common service area. However, it is not required that a notification is only provided to AC users in a common service area. A notification comprising presence information may be sent to any appropriate user for any appropriate reason. Thus, there may be a scenario where a notification is provided to UserID-2 and/or UserID-3 indicating that UserID-1 is located within EES service area 405, EAS service area 410 and/or EAS service area 414.

Figure 6B:
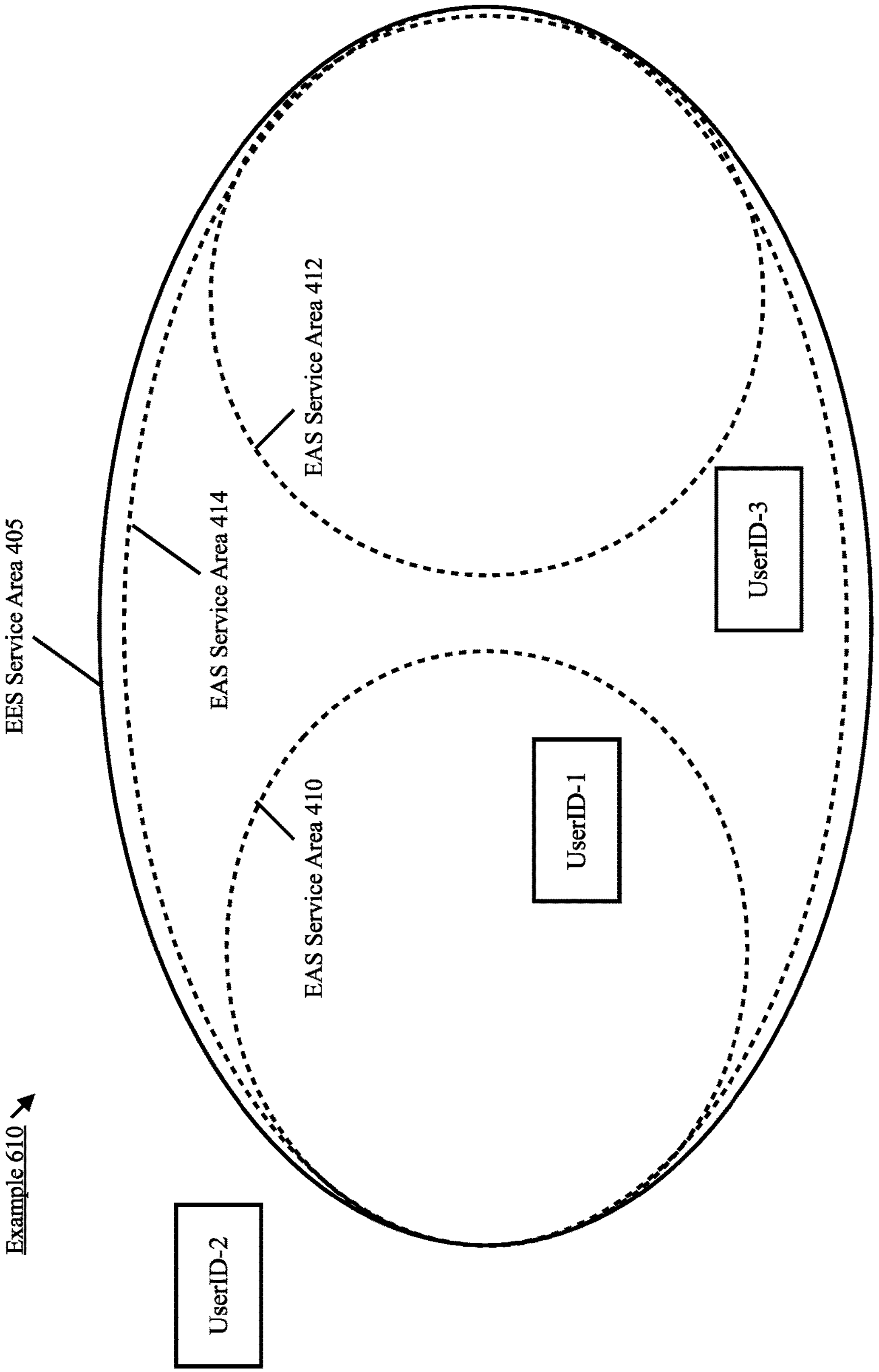

In example 610 of FIG. 6*b*, UserID-1 is shown within overlapping service areas including EES service area 405, EAS service area 410 and EAS service area 414. The presence server may record that UserID-1 is in EES service area 405, EAS service area 410 and EAS service area 414. UserID-2 is still located outside of any of the service areas shown in example 610. However, UserID-3 has moved within overlapping service areas including EES service area 405 and EAS service area 414. The presence server may record that UserID-3 is in EES service area 405 and EAS service area 410. In some embodiments, since UserID-1 and UserID-3 are in a common service area, UserID-1 and UserID-3 may each be notified of the others presence in EES service area 405 and/or EAS service area 414. However, as mentioned above, it is not required for the recipient of a notification to be deployed in a common service area. The notification may be sent to any appropriate user for any appropriate reasons. Thus, there may be a scenario where a notification is provided to UserID-2 indicating that UserID-1 is located within EES service area 405, EAS service area 410 and/or EAS service area 414 or a scenario where a notification is provided to UserID-2 that UserId-3 is located within EES service area 405 and/or EAS service area 414.

Figure 6C:
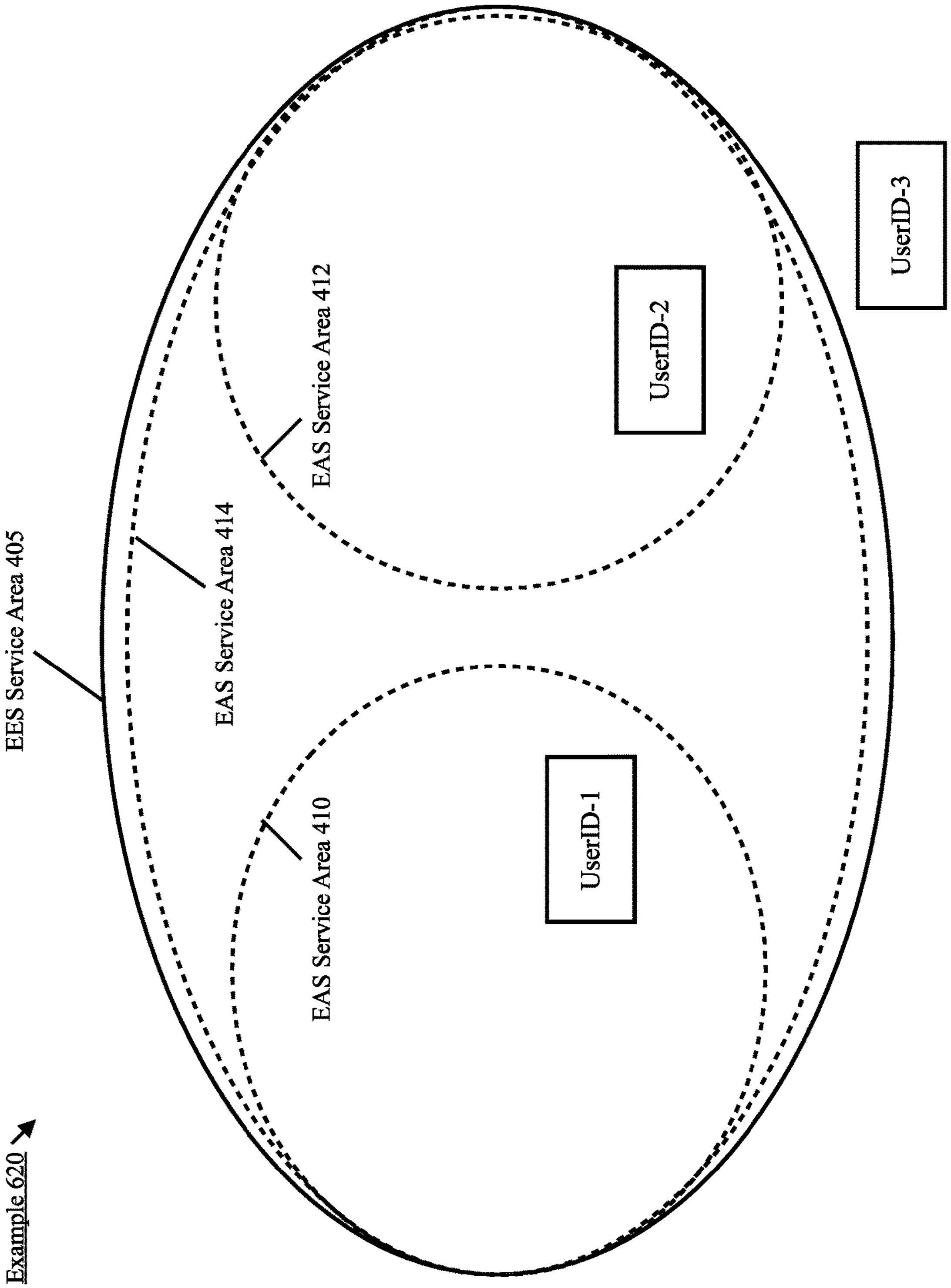

In example 620 of FIG. 6*c*, UserID-1 is still within overlapping service areas including EES service area 405, EAS service area 410 and EAS service area 414. The presence server may record that UserID-1 is in EES service area 405, EAS service area 410 and EAS service area 414. UserID-2 has moved into overlapping service areas including EES service area 405, EAS service area 412 and EAS service area 414. The presence server may record that UserID-2 is in EES service area 405, EAS service area 412 and EAS service area 414. However, UserID-3 has moved outside of any of the service areas shown in example 620. In some embodiments, since UserID-1 and UserID-2 are in a common service area, UserID-1 and UserID-2 may each be notified of the others presence in EES service area 405 and/or EAS service area 414. However, as mentioned above, it is not necessary for the recipient of the notification to be deployed in a common service area. The notification may be sent to any appropriate user for any appropriate reasons. Thus, there may be a scenario where a notification is provided to UserID-3 indicating that UserID-1 is located within EES service area 405, EAS service area 410 and/or EAS service area 414 or a scenario where a notification is provided to UserID-3 that UserId-2 is located within EES service area 405, EAS service area 412 and EAS instance 3 service area 414.

According to some aspects, the presence server may be implemented using a centralized approach. This approach will be described in more detail below with regard to the signaling diagram 700 of FIG. 7. According to other aspects, the presence server may be implemented using a distributed approach. This approach will be described in more detail below with regard to the signaling diagram 800 of FIG. 8.

Figure 7:
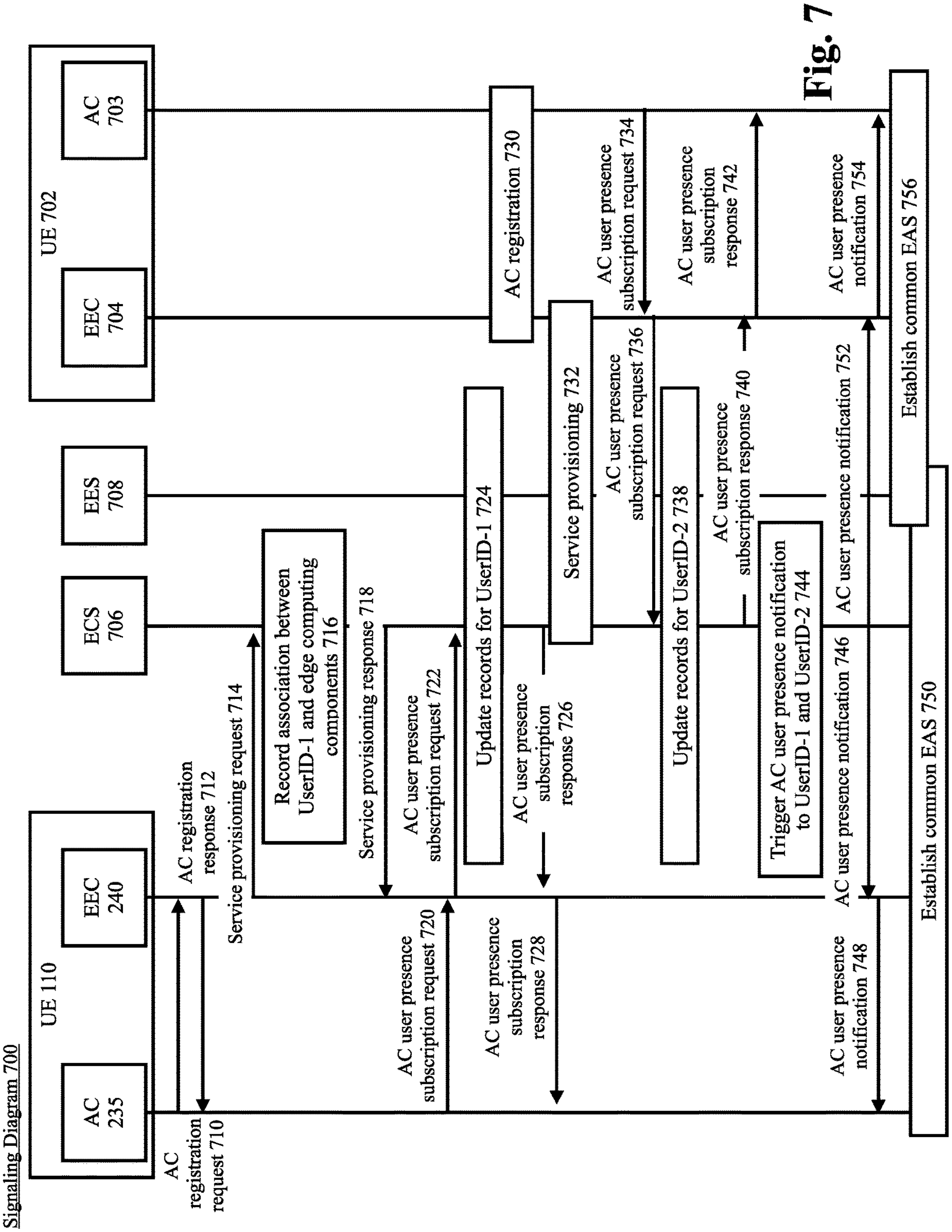
FIG. 7 shows a signaling diagram for notifying an AC user about the presence of another AC users in a common service area according to various exemplary embodiments.

FIG. 7 shows a signaling diagram 700 for notifying AC users about the presence of other AC users in a common service area. The signaling diagram 700 will be described with regard to the network arrangement 100 of FIG. 1 and the enabling architecture 300 of FIG. 3.

The signaling diagram 700 includes UE 110 comprising AC 235 and EEC 240 and a UE 702 comprising AC 703 and EEC 704. In this example, AC 235 and AC 703 share a common AC identifier (ACID) (e.g., ACID-1) despite running on different devices and the users of the ACs 235 and 703 are differentiated from one another based on unique application specific information, e.g., UserID-1 and UserID-2 respectively. However, in an actual deployment scenario, the ACs may have different ACIDs. For example, different applications may perform different tasks for a common use case. The exemplary embodiments do not require the ACs to have a same ACID and may be used for ACs that have different ACIDS.

The signaling diagram 700 also includes an ECS 706 and an EES 708. In this example, the ECS 706 is configured with the functionality described herein for the presence server. However, in an actual deployment scenario, the presence server may be implemented as an independent entity of the edge architecture or in any other appropriate virtual and/or physical location (e.g., within the mobile network operator's domain, within the edge serve provider domain or within a third-party domain).

As will be demonstrated below, the signaling diagram 700 builds up to triggering the identification of a common EAS (or EAS instance) suitable to serve both the AC 235 and the AC 703 such that the ACs 235 and 703 may interact with one another at the application level. The exemplary embodiments may enable users to avoid establishing a connection to an EAS until the AC user knows that another specific AC user or users are in a position to connect to the same EAS server (or EAS instance).

In 710, the AC 235 sends an AC registration request to the EEC 240. The AC registration request may include application specific information associated with the user, e.g., UserID-1. In some embodiments, the AC registration request may further include an indication that UserID-1 is permitting the presence server to share their presence information with other AC users. In 712, the EEC 240 sends an AC registration response to the AC 235. Those skilled in the art will understand the other types of information that may be included in the AC registration request and AC registration response messaged. It should also be understood that an AC registration update may be used instead of an AC registration request.

In 714, the EEC 240 sends a service provisioning request to the ECS 706. The service provisioning request may include information such as, but not limited to, the unique application specific information associated with the AC user (e.g., UserID-1), the AC identifier (ACID-1), UE location and one or more identifiers for an EAS (EASID). The EASIDs may represent a EAS currently serving the AC 235 and/or a target EAS that may serve the AC 235. If the UE location is not included, the ECS 706 may request the cellular core network 130 to provide the UE location.

In 716, the ECS 706 records and maintains an association between the unique application specific information associated with the user (e.g., UserID-1) and one or more components for enabling edge applications. In this example, the ECS 706 stores an association between UserID-1, ACID-1, an identifier for the EEC 240 (e.g., EECID-1), an identifier for an EES serving the AC 235 (e.g., EESID-1), UE location and any other EESIDs that may be used to serve the AC 235. However, this example is merely provided for illustrative purposes. The ECS 706 may maintain a database comprising unique application specific information (e.g., UserID) associated with any appropriate type of information (e.g., serving edge components, subscription information, etc.).

In 718, the ECS 706 sends a service provisioning response to the EEC 240. The service provisioning response may include an identifier for an EES that may serve the AC 235 (e.g., EESID-1). Those skilled in the art will understand the other types of information that may be included in the service provisioning request and service provisioning response.

In 720, the AC 235 sends an AC user presence subscription request to the EEC 240. The subscription request may include information such as, but not limited to, unique application specific information associated with the user (e.g., UserID-1), a list of one or more UserIDs (e.g., UserID-2, UserID-3) UserID-1 wants to track using the presence server, an indication that other users are permitted to track UserID-1 using the presence server, a list of UserIDs that are permitted to track UserId-1 using the presence server and a list of UserIDs that are not permitted to track UserID-1 using the presence server. In 722, the EEC 240 sends the AC user presence subscription request to the ECS 706.

According to some aspects, the exemplary embodiments introduce a parameter or information element (IE) that is configured to explicitly indicate whether and how an AC user's presence information is permitted to be shared with other users. Alternatively, the AC user presence subscription request may be indicated via the serving provisioning request provided in 718.

In 724, the ECS 706 updates its records for UserID-1 based on the subscription information. For instance, as indicated above, ECS 706 maintains a database comprising an association between the unique application specific information associated with the user (e.g., UserID-1) and one or more components for enabling edge applications (e.g., 716). The ECS 706 may update its database based on the subscription information provided by AC 235, e.g., trigger conditions, list of UserIDs to track to UserID1, a list of UserIDs that are not permitted to track UserID-1, etc.

In 726, the ECS 706 sends an AC user presence subscription response to the EEC 240. The response may indicate whether the subscription request is accepted, rejected and/or whether additional information is needed. In 728, the EEC 240 sends the AC user presence subscription response to the AC 235. Alternatively, the AC user presence subscription response may be indicated via the serving provisioning response provided in 728.

In 730, AC 703 registers with the EEC 704. This is process is explained above with regard to 710-712.

In 732, the EEC 704 performed service provisioning with the ECS 706. An example of Service provisioning is described above with regard to 714-718. Thus, at this time, the ECS 706 may have a stored association between the unique application specific information associated with the user (e.g., UserID-2) and one or more components for enabling edge applications.

In this example, the ECS 706 stores an association between UserID-2, ACID-1, the UE location of UE 702, an identifier for the EEC 704 (e.g., EECID-2), an identifier for an EESID for an EES facilitating communication for the AC 703 and any other suitable EESIDs. However, this example is merely provided for illustrative purposes. The ECS 706 may maintain as association between the unique application specific information associated with the AC user (e.g., UserID-2) and one or more components for enabling edge applications using any appropriate type of information.

In 734, the AC 703 sends an AC user presence subscription request to the EEC 704. The subscription request may include information such as, but not limited to, UserID-2, a list of one or more UserIDs (e.g., UserID-1, UserID-4) that UserID-2 wants to track using the presence server, an indication that other users are permitted to track UserID-2 using the presence server, a list of UserIDs that are permitted to track UserId-2 using the presence server and a list of UserIDs that are not permitted to track UserID-2 using the presence server. In 736, the EEC 704 sends the AC user presence subscription request to the ECS 706.

In 738, the ECS 706 updates its records for UserID-2 based on the subscription information. For instance, as indicated above, ECS 706 maintains a database comprising an association between the unique application specific information associated with the user (e.g., UserID-2) and one or more components for enabling edge applications. The ECS 706 may update its database to include the subscription information provided by AC 703, e.g., trigger conditions, list of UserIDs to track to UserID1, a list of UserIDs that are not permitted to track UserID-1, etc.

In 740, the ECS 706 sends an AC user presence subscription response to the EEC 704. The response may indicate whether the subscription request is accepted, rejected and/or whether additional information is needed. In 742, the EEC 704 sends the AC user presence subscription response to the AC 703.

In 744, the ECS 706 identifies a condition that triggers the transmission of an AC user presence notification to UserID-1 and UserID-2. For example, the ECS 706 may identify a common EAS service area for the AC users.

As indicated above, AC users may provide information related to their preferences for receiving AC user presence notifications. For example, in the subscription request or any other appropriate message, UserID-1 may indicate a status related to the delivery of notifications to UserID-1 (e.g., do not disturb, available, etc.), conditions during which UserID-1 is not to receive any notifications about the presence of other users (e.g., location, time, etc.), conditions during which one or more AC users are to receive a user presence notification about UserID-1 and conditions during which one or more AC users are not to receive a user presence notification about UserID-1. Further, although not shown in the signaling diagram 700, an application provider may configure the presence server to operate in accordance with certain rules and policies. For example, the presence server may be limited to providing notifications to users located in their home access network or across common edge compute service provider (ECSP) domains. This information may be taken into account when determining whether a particular AC is to receive a notification about the presence of another AC user.

In this example, assume a scenario in which UserID-1 has indicated that UserID-2 is permitted to receive presence information for UserID-1 and vice versa. However, in an actual deployment scenario, a scenario may occur where UserID-1 has indicated that UserID-2 is permitted to receive presence information for UserID-1 but UserID-2 has not provided this type of indication or has provided an explicit indication that UserID-1 is not permitted to be notified about UserID-2 presence information. In this type of scenario, the ECS 706 may decide not to send one or both of the AC user presence notifications.

In 746, the ECS 706 sends an AC user presence notification to the EEC 240. The AC user presence notification may be sent to the EECID associated with AC UserID-1 based on the subscription information stored at the ECS 706 and indicate that UserID-2 is available for interaction at one or more particular EASs (e.g., EASID-1). In 748, the EEC 240 sends the AC user presence notification to the AC 235. In some embodiments, in addition to the initial notification, periodic notifications may be provided for regarding the presence of certain AC users in the particular areas.

In 750, the UE 110 (e.g., AC 235, EEC 240) may trigger establishment to an EAS that is common to UserID-1 and UserID-2 with the EES 708.

Similarly, in 752, the ECS 706 sends an AC user presence notification to the EEC 704. The AC user presence notification may be sent to the EECID associated with UserID-2 based on the subscription information stored at the ECS 706 and indicate that UserID-1 is available for interaction at one or more particular EASs (EASID-1). In 754, the EEC 704 sends the AC user presence notification to the AC 703.

In 756, the UE 702 (e.g., AC 703, EEC 704) may trigger establishment to an EAS that is common to UserID-1 and UserID-2 with the EES 708.

Figure 8:
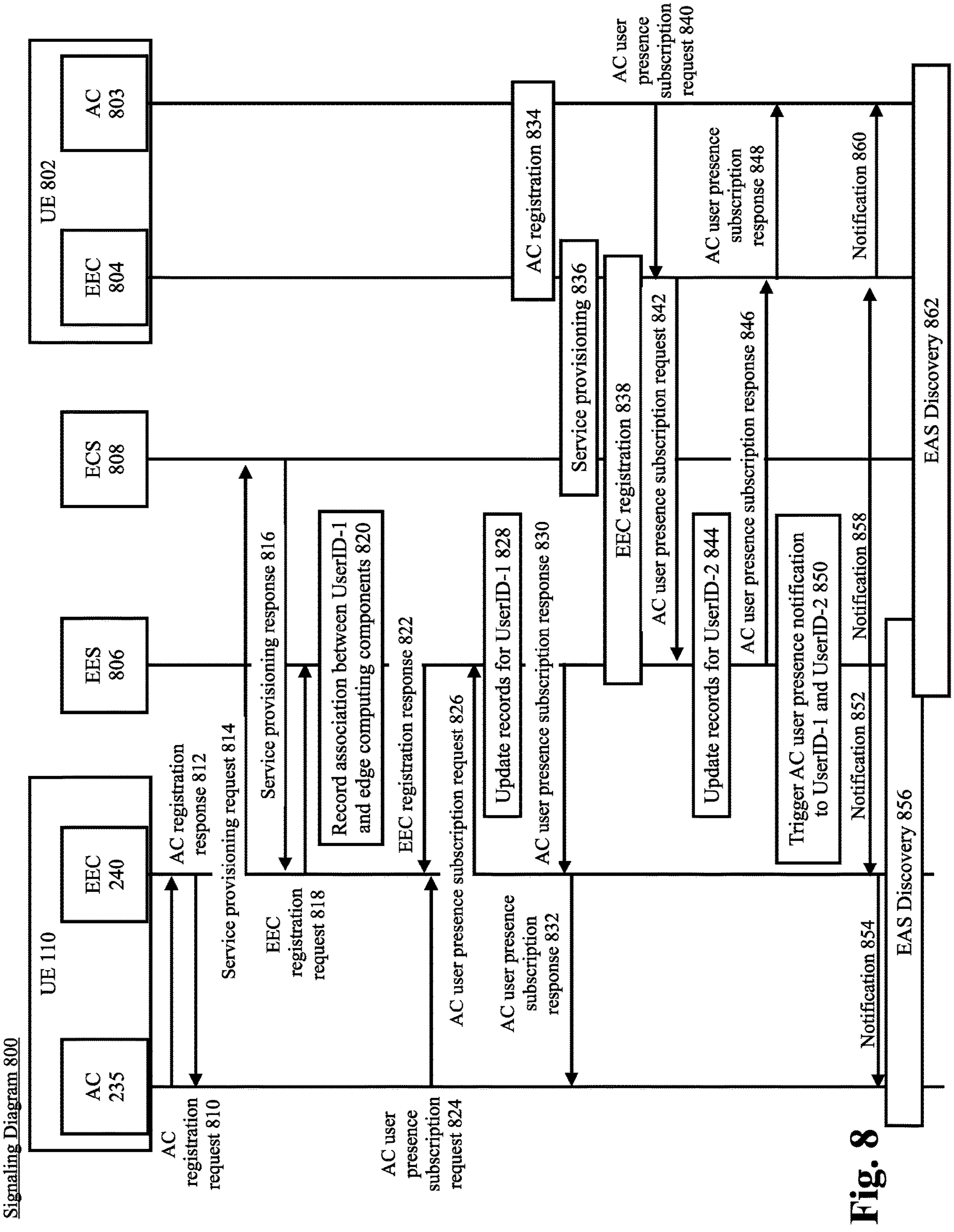
FIG. 8 shows a signaling diagram for notifying an AC user about the presence of another AC user in a common service area according to various exemplary embodiments.

FIG. 8 shows a signaling diagram 800 for notifying an AC user about the presence of another AC user in a common service area according to various exemplary embodiments. The signaling diagram 800 will be described with regard to the network arrangement 100 of FIG. 1 and the enabling architecture 300 of FIG. 3.

The signaling diagram 800 includes UE 110 comprising AC 235 and EEC 240 and a UE 802 comprising AC 803 and EEC 804. In this example, AC 235 and AC 803 share a common ACID (e.g., ACID-1) despite running on different devices and the users of the ACs 235 and 803 are differentiated from one another based on unique application specific information, e.g., UserID-1 and UserID-2 respectively. However, as indicated above, the exemplary embodiments do not require the ACs to have a same ACID and may be used for ACs that have different ACIDs.

The signaling diagram 800 also includes EES 806 and ECS 808. In contrast to the centralized approach described above with regard to FIG. 7, when using a distributed approach there may be a presence server per edge data network or per EES. In this example EES 806 is configured with the functionality described herein for the presence server.

In 810, the AC 235 sends an AC registration request to the EEC 240. The AC registration request may include application specific information associated with the user, e.g., UserID-1. In some embodiments, the AC registration request may further include an indication that UserID-1 is permitting the presence server to share their presence information with other AC users. In 812, the EEC 240 sends an AC registration response to the AC 235. Those skilled in the art will understand the other types of information that may be included in the AC registration request and AC registration response messaged. It should also be understood that an AC registration update may be used instead of an AC registration request.

In 814, the EEC 240 sends a service provisioning request to the ECS 808. In 816, the ECS 808 sends a service provisioning response to the EEC 240. Those skilled in the art will understand the type of information that may be included in the service provisioning request and service provisioning response.

In 818, the EEC 240 sends an EEC registration request to the EES 806. The EEC registration request may include information such as, but not limited to, the unique application specific information associated with the AC user (e.g., UserID-1), the AC identifier (ACID-1), UE location and one or more identifiers for an EAS (EASID). The EASIDs may represent an EAS currently serving the AC 235 and/or a target EAS that may serve the AC 235. If the UE location is not included, the EES 806 may request the cellular core network 130 to provide the UE location.

In 820, the EES 806 records and maintains an association between the unique application specific information associated with the user (e.g., UserID-1) and one or more components for enabling edge applications. In this example, the EES 806 stores an association between UserID-1, ACID-1, an EECID for the EEC 240 (EECID-1), UE location and an identifier for EES 806 (e.g., EESID-1). However, this example is merely provided for illustrative purposes. The EES 806 may maintain a database comprising unique application specific information (e.g., UserID) associated with any appropriate type of information (e.g., serving edge components, subscription information, etc.).

In 822, the EES 806 sends an EEC registration response to the EEC 240. Those skilled in the art will understand the type of information that may be included in the EEC registration response.

In 824, the AC 235 sends an AC user presence subscription request to the EEC 240. The subscription request may include information such as, but not limited to, unique application specific information associated with the user (e.g., UserID-1), a list of one or more UserIDs (e.g., UserID-2, UserID-3) UserID-1 wants to track using the presence server, an indication that other users are permitted to track UserID-1 using the presence server, a list of UserIDs that are permitted to track UserId-1 using the presence server and a list of UserIDs that are not permitted to track UserID-1 using the presence server. In 826, the EEC 240 sends the AC user presence subscription request to the EES 806.

In 828, the EES 806 updates its records for UserID-1 based on the subscription information. For instance, as indicated above, EES 806 maintains a database comprising an association between the unique application specific information associated with the user (e.g., UserID-1) and one or more components for enabling edge applications (e.g., 820). The EES 806 may update its database based on the subscription information provided by AC 235, e.g., trigger conditions, list of UserIDs to track to UserID1, a list of UserIDs that are not permitted to track UserID-1, etc.

In 830, the EES 806 sends an AC user presence subscription response to the EEC 240. The response may indicate whether the subscription request is accepted, rejected and/or whether additional information is needed. In 832, the EEC 240 sends the AC user presence subscription response to the AC 235. Alternatively, in some embodiments, the AC user presence subscription establishment request may be implicit through the inclusion of application identification information in the EEC registration procedure and updated through EEC registration update.

In 834, AC 703 registers with the EEC 804. This is process is explained above with regard to 810-812.

In 836, the EEC 804 performs service provisioning with the ECS 808. An example of Service provisioning is described above with regard to 814-816.

In 838, the EEC 804 performs EEC registration with the EES 806. An example of EEC registration is described above with regard to 818-822. Thus, at this time, the ECS 808 may have a stored association between the unique application specific information associated with the user (e.g., UserID-2) and one or more components for enabling edge applications.

In this example, the EES 806 stores an association between UserID-2, ACID-1, EESID-1 and an identifier for the EEC 704 (e.g., EECID-2. However, this example is merely provided for illustrative purposes. The EES 806 may maintain as association between the unique application specific information associated with the AC user (e.g., UserID-2) and one or more components for enabling edge applications using any appropriate type of information.

In 840, the AC 803 sends an AC user presence subscription request to the EEC 704. The subscription request may include information such as, but not limited to, UserID-2, a list of one or more UserIDs (e.g., UserID-1, UserID-4) that UserID-2 wants to track using the presence server, an indication that other users are permitted to track UserID-2 using the presence server, a list of UserIDs that are permitted to track UserId-2 using the presence server and a list of UserIDs that are not permitted to track UserID-2 using the presence server. In 842, the EEC 804 sends the AC user presence subscription request to the EES 806.

In 844, the EES 806 updates its records for UserID-2 based on the subscription information. For instance, as indicated above, EES 806 maintains a database comprising an association between the unique application specific information associated with the user (e.g., UserID-2) and one or more components for enabling edge applications. The EES 806 may update its database to include the subscription information provided by AC 803, e.g., trigger conditions, list of UserIDs to track to UserID1, a list of UserIDs that are not permitted to track UserID-1, etc.

In 846, the EES 806 sends an AC user presence subscription response to the EEC 804. The response may indicate whether the subscription request is accepted, rejected and/or whether additional information is needed. In 848, the EEC 804 sends the AC user presence subscription response to the AC 803. Alternatively, in some embodiments, the AC user presence subscription establishment request may be implicit through the inclusion of application identification information in the EEC registration procedure and updated through EEC registration update.

In 850, the EES 806 identifies a condition that triggers the transmission of an AC user presence notification to UserID-1 and UserID-2. For example, the EES 806 may identify a common EAS service area for the AC users.

As indicated above, AC users may provide information related to their preferences for receiving AC user presence notifications. For example, in the subscription request or any other appropriate message, UserID-1 may indicate a status related to the delivery of notifications to UserID-1 (e.g., do not disturb, available, etc.), conditions during which UserID-1 is not to receive any notifications about the presence of other users (e.g., location, time, etc.), conditions during which one or more AC users are to receive a user presence notification about UserID-1 and conditions during which one or more AC users are not to receive a user presence notification about UserID-1. Further, although not shown in the signaling diagram 800, an application provider may configure the presence server to operate in accordance with certain rules and policies. For example, the presence server may be limited to providing notifications to users located in their home access network or across common edge compute service provider (ECSP) domains. This information may be taken into account when determining whether a particular AC is to receive a notification about the presence of another AC user.

In 852, the EES 806 sends an AC user presence notification to the EEC 240. The AC user presence notification may be sent to the EECID associated with AC UserID-1 based on the subscription information stored at the EES 806 and indicate that UserID-2 is available for interaction at one or more particular EASs (e.g., EASID-1). In 854, the EEC 240 sends the AC user presence notification to the AC 235.

In 856, the UE 110 (e.g., AC 235, EEC 240) may trigger EAs discovery to establish a connection to an EAS that is common to UserID-1 and UserID-2 via the EES 806.

Similarly, in 858, the EES 806 sends an AC user presence notification to the EEC 804. The AC user presence notification may be sent to the EECID associated with UserID-2 based on the subscription information stored at the EES 806 and indicate that UserID-1 is available for interaction at one or more particular EASs (EASID-1). In 860, the EEC 804 sends the AC user presence notification to the AC 803.

In 862, the UE 802 (e.g., AC 703, EEC 704) may trigger EAS discovery to establish a connection to an EAS that is common to UserID-1 and UserID-2 via the EES 806.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above-described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

As described above, one aspect of the present technology is the gathering and use of data available from specific and legitimate sources. The present disclosure contemplates that in some instances, this gathered data may include personal information data that uniquely identifies or can be used to identify a specific person. Such personal information data can include location data, online identifiers, application specific user information, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, location information may be used to determine when users are in a common service area.

The present disclosure contemplates that those entities responsible for the collection, analysis, disclosure, transfer, storage, or other use of such personal information data will comply with well-established privacy policies and/or privacy practices.

In particular, such entities would be expected to implement and consistently apply privacy practices that are generally recognized as meeting or exceeding industry or governmental requirements for maintaining the privacy of users. Such information regarding the use of personal data should be prominent and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, a user may not consent to being tracked by the presence server. Accordingly, the presence server may only record a user's presence in a service area if the user has explicitly consented to the collection of such information.

It is the intent of the present disclosure that personal information data should be managed and handled in a way to minimize risks of unintentional or unauthorized access or use. In addition to the examples provided above, risk can be minimized by limiting the collection of data and deleting data once it is no longer needed. When applicable, data de-identification can be used to protect a user's privacy. De-identification may be facilitated, when appropriate, by removing identifiers, controlling the granularity or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, the exemplary presence server does not require a specific location of the user and the location granularity may be limited to a high level, e.g., inside or outside of a service area.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:

at an edge configuration server:

receiving a service provisioning request from a first user equipment (UE) with a first application client (AC), the service provisioning request comprising application specific user information for a first AC user and a location of the first UE;

receiving application specific user information for a second AC user from a second UE with a second AC;

identifying a condition related to the location of the first UE relative to one or more service areas related to edge computing; and transmitting a notification to the second UE, the notification indicating a presence of the first AC user relative to the one or more service areas.

2. The method of claim 1, further comprising:

recording an association between the application specific user information for the first AC user, at least one of an AC ID, an edge enabler client (EEC) ID and at least one edge enabler server (EES) ID.

3. The method of claim 2, wherein the first AC and the second AC have a same AC ID.

4. The method of claim 1, further comprising:

receiving a subscription request from the first AC, the subscription request comprising an indication that the second AC user is permitted to receive the notification indicating the presence of the first AC user.

5. The method of claim 1, further comprising:

receiving a subscription request from the second AC, the subscription request comprising a request for presence information of the first AC user.

6. The method of claim 5, wherein the subscription request is provided as part of service provisioning.

7. The method of claim 1, wherein the edge configuration server is a presence server separate from an edge enabler server (EES).

8. The method of claim 1, wherein the edge configuration server receives the service provisioning request from an edge enabler client (EEC) of the first UE.

9. The method of claim 1, wherein the application specific user information further comprises an AC identifier associated with the AC user and one or more identifiers for an edge application server.

10. A method, comprising:

at a user equipment (UE) comprising an application client (AC):

transmitting a service provisioning request comprising application specific user information for a first AC user and a location of the UE to an edge configuration server;

transmitting subscription information to the edge configuration server, the subscription information including a request for information corresponding to at least a second AC user relative to one or more service areas relating to edge computing; and receiving a notification from the edge configuration server, the notification indicating a presence of the second AC user relative to the one or more service areas.

11. The method of claim 10, further comprising:

triggering establishment of a connection to a common edge application server (EAS) for the first AC user or the second AC user.

12. The method of claim 10, further comprising:

triggering edge application server (EAS) discovery for a common EAS for the first AC user or the second AC user.

13. The method of claim 10, the subscription information further comprising an indication that the second AC user is permitted to receive information indicating a presence of the first AC user relative to one or more service areas.

14. The method of claim 10, wherein the edge configuration server is a presence server separate from an edge enabler server (EES).

15. The method of claim 10, further comprising:

triggering establishment of a connection to a common edge application server (EAS) for the first AC user upon receipt of a notification indicating a presence of the second AC user in a same service area as the first AC user.

16. The method of claim 10, further comprising:

refraining from triggering establishment of a connection to a common edge application server (EAS) for the first AC user until receipt of a notification indicating a presence of the second AC user in a same service area as the first AC user.

17. The method of claim 10, wherein an edge enabler client (EEC) of the UE sends the service provisioning request to the edge configuration server.

18. The method of claim 10, wherein the application specific user information further comprises an AC identifier associated with the AC user and one or more identifiers for an edge application server.

* * * * *